Aug. 7, 1945.　　　C. T. SPEAR　　　2,381,231
FISH LURE
Filed March 15, 1943　　2 Sheets-Sheet 1

C. T. Spear
INVENTOR.

BY Elwin W. Huler
Attorney

Aug. 7, 1945.  C. T. SPEAR  2,381,231
FISH LURE
Filed March 15, 1943  2 Sheets-Sheet 2
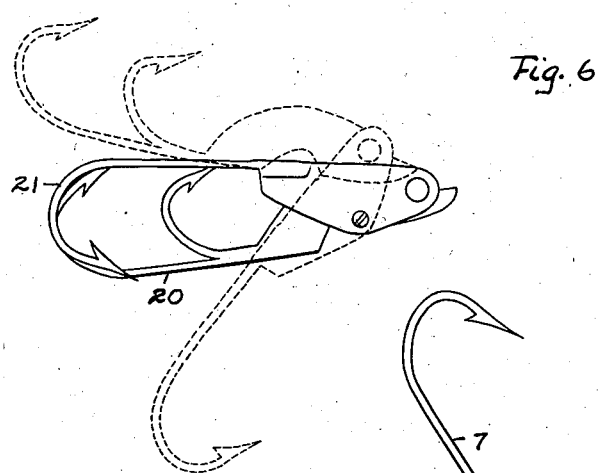
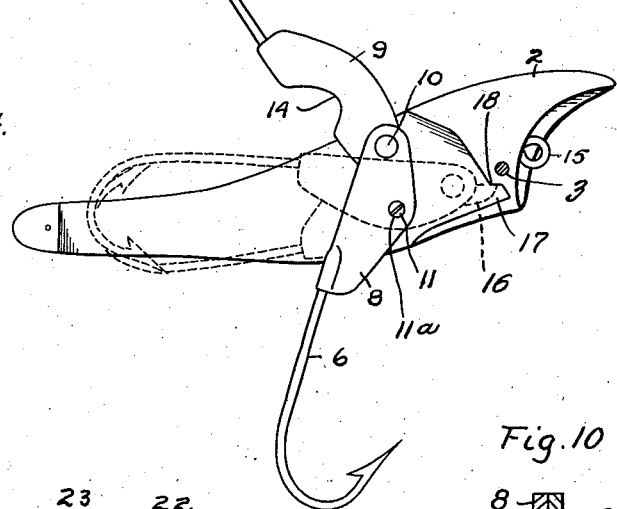
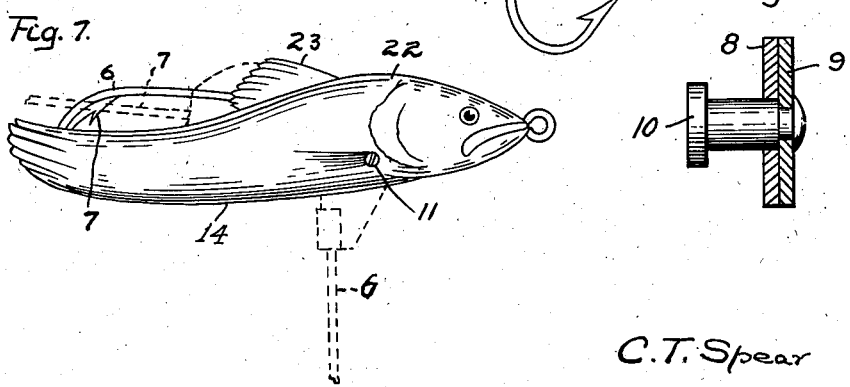
C. T. Spear
INVENTOR.
BY *Elwin M. Hulse*
Attorney Patented Aug. 7, 1945

2,381,231

UNITED STATES PATENT OFFICE 2,381,231

FISH LURE

Clifton T. Spear, Texarkana, Tex.

Application March 15, 1943, Serial No. 479,192

10 Claims. (Cl. 43—35)

The invention relates to fish lures and particularly to the weedless type of such lures.

The object of the invention is to provide a lure in which the hooks are normally shielded by each other and by the body from contact with weeds and other growths in water, and are projected outwardly from the body when either one is contacted by a fish in striking the bait.

The invention consists in the novel arrangement and combination of a plurality of fish hooks in a body, hereinafter described and illustrated in the accompanying drawings in which Figure 1 is a side elevation of a lure having the invention applied thereto.

Fig. 4 is a similar side view with the hooks fully open, the spring being omitted.

Fig. 6 is a modification of the hook assembly, and Fig. 7 is a side elevation of a modified form of body having the invention applied thereto.

Fig. 10 is a detail showing sections of certain hook carrying plates used herein and the pivot pin which connects these plates.

Figure 1:
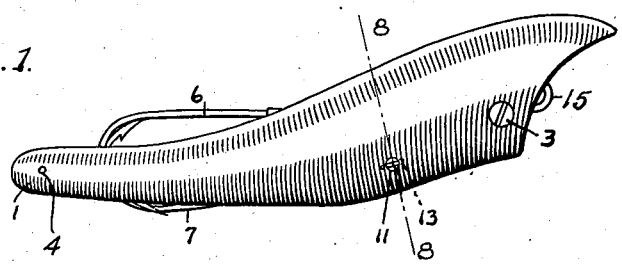
Figure 2:
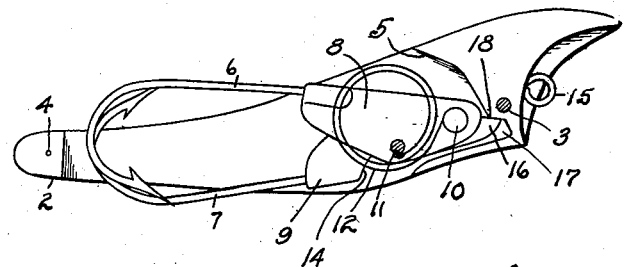
Fig. 2 is a side elevation of a lure with one side member of the body removed.

Referring to the illustrative embodiment of the invention, the body in any desired shape is preferably formed in two longitudinal sections 1, 2 that are secured together by the screw or bolt 3 and the pin 4. A recess is formed in each section to form the hook mechanism receiving cavity or space 5 which opens exteriorly at the top and bottom of the body.

The hook mechanism comprises two hooks 6, 7 having the plates 8, 9 secured to their rear ends respectively. A pin 10 extends through the forward end of both plates upon which the plates pivot. A shaft 11 extends loosely through the plate 8 and forms a bearing on which it may pivot, the opposite ends of the shaft being anchored in the body sections. The inner end of a coiled spring 12 is secured to the shaft 11 and the outer end thereof is connected to the pivot 10. Tension on the spring 12 is adjusted by rotating the shaft 11, the shaft being held in adjusted position by any suitable means, as by a wire or pin 13 which is inserted in the body and into the slot 11a in the end of the shaft. The plate 9 of the hook 7 is recessed at 14 in its lower portion to receive the shaft 11 in all positions of the hooks. The line is attached to the eye 15 in the forward end of the body.

The forward end of the plate 9 is formed with a projecting lug 16 that normally extends into a recess 17 formed in the forward end wall of the cavity 5 in the body and the lug normally contacts the shoulder 18. In that position the shanks of the hooks project somewhat from the top and bottom of the body, respectively, the shank of the hook 6 being projected more than the shank of the hook 7, and the barbed ends of the hooks also project more or less from the body but are protected by the shanks.

Figure 3:
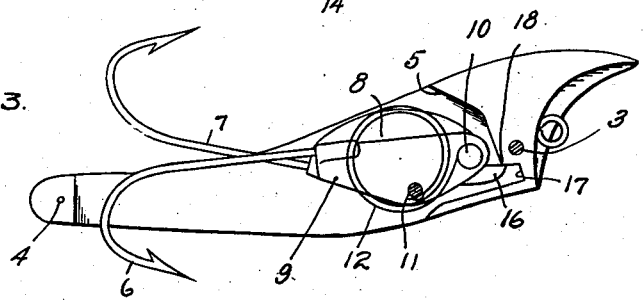
Fig. 3 is a similar side view with the hooks partly open.
Figure 5:
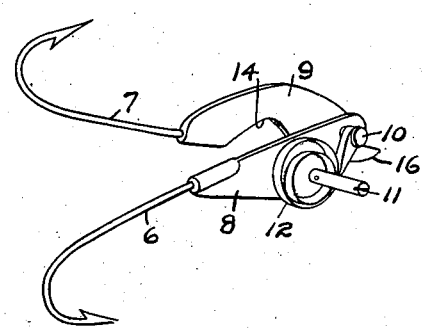
Fig. 5 is a perspective view of the hook assembly.
Figure 8:
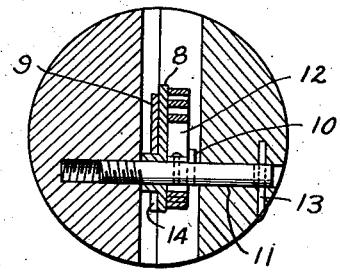
Fig. 8 is a section on the line 8—8 of Fig. 1.
Figure 9:
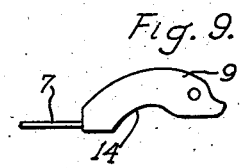
Fig. 9 is a side view of one of the hooks.

If a fish strikes the bait and presses downwardly on the hook 6, even slightly, the lug 16 on the plate 9 of the hook 7 being in contact with the shoulder 18 as shown in Fig. 3, the pivot 10 and the rear end of the plate 9 on the hook 7 rock upwardly causing the forward end of the plate 9 to rock upwardly and the hook 7 to instantly project above the body, with the shoulder 18 as a fulcrum, the ratio of movement of the two hooks being about 4 to 1. The hook 7 flies up into the roof of the mouth of the fish causing the fish to strike back thereby setting hook 7 in the upper part of its mouth. Any back pressure on the hook 7 forces the hook 6 further down and into the lower part of the mouth of the fish. The least backward pull on the hook 7 will tilt the entire lure, the line hitch acting as the point of the pivot, thus instantly releasing the lug 16 from the shoulder 18, whereupon the hooks open (Fig. 4) and spread in the mouth of the fish and engage in both the upper and lower jaws thereof. The greater the pull on the lure by the fish, the deeper the hooks will set in its jaws and cannot be ejected by the fish.

In Fig. 6 one of the hooks 20 carries two barbed members.

In Fig. 7 I illustrate the invention applied to a different form of body 22 in which a fin 23 is disposed on top of the body. The shank of the hook 7 is shown in dotted lines in the extreme backward position which might occur should the hook 6 fail to engage the lower part of the mouth of the fish. On the other hand should the hook 7 fail to remain in the jaw or pull out, the other hook 6 could hold the fish, reversing the position of the two hooks shown in Fig. 7.

What I claim is:

1. In a fish lure, a lure body, a plurality of hooks pivoted together to fold partially together substantially within the body with their barbs facing each other, a bearing shaft supported by the body upon which one of the hooks is mounted to rock, a shoulder in the body, a lug on the other hook resting under the shoulder, and resilient means tending to retain the hooks in normal position.

2. In a fish lure, a lure body, a plurality of hooks pivotally connected together for relative movement and having their barbs facing each other, a bearing shaft supported by the body upon which one of the hooks is mounted to rock, a shoulder in the body, and a lug carried by the other hook and normally resting under the shoulder, said shoulder forming a fulcrum for the last mentioned hook, whereby when pressure is exerted downwardly on the shaft supported hook the pivotal connection between the hooks will be raised and the lug carrying hook will be thrown upwardly.

3. In a fish lure, a lure body, a plurality of hooks pivotally connected together for relative movement and having their barbs facing each other, the shank of at least one hook projecting from the body, a transverse bearing shaft supported by the body upon which one of the hooks is mouned to rock, a shoulder in the body, a lug carried by the other hook and normally engaged under the shoulder, said shoulder forming a fulcrum for the lug bearing hook, and means tending to maintain the said engagement of the lug and shoulder, whereby when the hook having the projecting shank is depressed the engagement of the lug beneath the shoulder and the upward movement of the pivotal connection between the hooks causes the other hook to rise in ratio to the movement of the depressed hook.

4. In a fish lure, a lure body, a pair of hooks pivotally connected together within the body, said hooks projecting slightly from the rearward portion of the body and being adapted to move outwardly in opposite directions from the body, a bearing supported by the body on which one of the fish hooks pivots, and a resilient member opposing the pivotal movement of said pivotal hook, portions of the shanks of the hooks being normally exteriorly of the body.

5. In a fish lure, a recessed lure body, a pair of hooks pivotally connected together within the body and normally having their shanks and barbed ends projecting from opposite sides of the body and in opposite directions, a bearing shaft within the body upon which one of the hooks pivots, and a resilient member to oppose the pivotal movement of the latter hook.

6. In a fish lure, a recessed lure body, a pair of hooks pivotally connected together within the body and normally having their shanks and barbed ends projecting from opposite sides of the body and in opposite directions, a bearing shaft within the body upon which one of the hooks pivots, a spring urging said hooks into overlapping position, and a shoulder in the body on which the other hook fulcrums.

7. In a fish lure, a recessed lure body, a bearing shaft extending laterally across the body and through the recess, a pair of hooks normally lying partially within the recess and pivotally connected together with their barbed ends opposed and being adapted to be projected in opposite directions from the body, and a resilient member connected to the bearing shaft and to the pivotal connection, one of the hooks being pivotally mounted on the bearing shaft.

8. In a fish lure, a recessed lure body, a pair of hooks pivotally connected together within the body and normally having their shanks and barbed ends projecting from opposite sides of the body and in opposite directions, a bearing shaft within the body upon which one of the hooks pivots, a resilient member to oppose the pivotal movement of said latter pivotal hook, a lug projecting from the rear end of the other hook, and a shoulder within the body normally engaged by the lug.

9. In a fish lure, a recessed lure body, a bearing within the body, a hook pivotally mounted on the bearing and having a portion of its shank normally projecting from one side of the body and its barbed end projecting from the opposite side of the body, a second hook pivotally connected to the first hook and having its shank normally projecting from the opposite side of the body relatively to the shank of the other hook, a fulcrum for the second hook, the arrangement being such that external pressure on the first hook causes it to initially descend to swing the barbed second hook upwardly and in ratio to the movement of the descending hook and then to cause both hooks to open outwardly from the body in opposite directions, and resilient means to oppose the said movements of the hooks.

10. A fish lure having a vertically slotted body, a pair of oppositely directed hooks mounted in the slot of the body to move in and out of said slot, pivot means connecting said hooks at their forward ends, a pivot pin extending across said slot and having one of the hooks mounted thereon, the remaining hook having its forward end normally fulcrumed within the slot, and spring means normally holding the hooks in partially housed position relative to the body.

CLIFTON T. SPEAR.